US009319302B2

(12) United States Patent
Chen

(10) Patent No.: US 9,319,302 B2
(45) Date of Patent: Apr. 19, 2016

(54) SYSTEM AND METHOD FOR TRAFFIC ENGINEERING INFORMATION SUMMARY OF A ZONE IN NETWORK COMMUNICATIONS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 441 days.

(21) Appl. No.: 13/829,273

(22) Filed: Mar. 14, 2013

(65) Prior Publication Data

US 2013/0254195 A1    Sep. 26, 2013

Related U.S. Application Data

(60) Provisional application No. 61/615,072, filed on Mar. 23, 2012.

(51) Int. Cl.
| | |
|---|---|
| *G06F 15/173* | (2006.01) |
| *H04L 12/729* | (2013.01) |
| *H04L 12/721* | (2013.01) |
| *H04L 12/715* | (2013.01) |
| *H04L 12/717* | (2013.01) |
| *H04L 12/803* | (2013.01) |
| *H04L 12/723* | (2013.01) |

(52) U.S. Cl.
CPC .............. *H04L 45/125* (2013.01); *H04L 45/04* (2013.01); *H04L 45/42* (2013.01); *H04L 45/44* (2013.01); *H04L 47/122* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 7,319,691 | B2 * | 1/2008 | Qing et al. | 370/351 |
| 2004/0042402 | A1 * | 3/2004 | Galand et al. | 370/237 |
| 2004/0255323 | A1 * | 12/2004 | Varadarajan et al. | 725/25 |
| 2007/0121503 | A1 * | 5/2007 | Guo et al. | 370/230 |
| 2012/0069740 | A1 * | 3/2012 | Lu et al. | 370/238 |
| 2012/0243443 | A1 | 9/2012 | Li et al. | |

OTHER PUBLICATIONS

Li, et al, "Simple Topology Transparent Zoning in Network Communications," U.S. Appl. No. 13/646,481, filed Oct. 5, 2012, 54 pages.
Bradner, "Key Words for Use in RFCs to Indicate Requirement Levels," BCP 14, RVC 2119, Mar. 1997, 3 pages.
Moy, "OSPF Version 2," STD 54, RFC 2328, Apr. 1998, 244 pages.
Coltun, "The OSPF Opaque LSA Option," RFC 2370, Jul. 1998, 15 pages.
Katz, et al., "Traffic Engineering (TE) Extensions to OSPF Version 2," RFC 3630, Sep. 2003, 14 pages.

(Continued)

*Primary Examiner* — Joshua Joo
(74) *Attorney, Agent, or Firm* — Conley Rose, P.C.; Grant Rodolph; Adam J. Stegge

(57) ABSTRACT

A method for summarizing topology transparent zone (TTZ) traffic engineering (TE) information, comprising computing a TE link state for every TE link internal to a TTZ from a root node to one or more non-root edge nodes, wherein the TE link state comprises the maximum bandwidth of the link, summarizing the computed TE link state information and storing the summary in a memory, and distributing at least a portion of the information in the summary to at least one neighboring node external to the TTZ connected to the root node via an external link.

14 Claims, 7 Drawing Sheets

(56) References Cited

OTHER PUBLICATIONS

Vasseur, Ed., et al., "A Backward-Recursive PCE-Based Computation (BRPC) Procedure to Compute Shortest Constrained Inter-Domain Traffic Engineering Label Switched Paths," RFC 5441, Apr. 2009, 19 pages.

Vasseur, Ed., et al., "Path Computation Element (PCE) Communication Protocol (PCEP)," RFC 5440, Mar. 2009, 88 pages.

* cited by examiner

SYSTEM AND METHOD FOR TRAFFIC ENGINEERING INFORMATION SUMMARY OF A ZONE IN NETWORK COMMUNICATIONS

CROSS-REFERENCE TO RELATED APPLICATIONS

This application claims priority to U.S. Provisional Application No. 61/615,072, filed Mar. 23, 2012, by Huaimo Chen, titled "System and Method for Traffic Engineering Information Summary of a Zone in Network Communications," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates to establishing Multi-Protocol Label Switching (MPLS) TE Label Switching Paths (LSPs) crossing multiple traffic engineering (TE) information summary areas that hide TE link state information, e.g., topology transparent zones (TTZs). TTZs are generally known in the art, as set forth in U.S. patent application Ser. No. 13/372,592, filed Feb. 14, 2012, by Renwei Li, et al., titled "System and Method for Topology Transparent Zoning in Network Communications" (herein, "the '592 application") and Ser. No. 13/646,481, filed Oct. 5, 2012, by Renwei Li, et al., titled "Simple Topology Transparent Zoning in Network Communications" (herein, "the '481 application"), both incorporated herein by reference.

The number of routers in an Autonomous System (AS) grows with Internet traffic. As a result, the sizes of Open Shortest Path First (OSPF) Link State Databases (LSDBs), TE Databases (TEDs), and OSPF routing tables may increase. Any link state change including TE link state change in an AS may lead to a number of link state distributions to every router in the AS.

Internet Engineering Task Force (IETF) Request for Comments (RFC) 2328, entitled "OSPF Version 2," describes OSPF areas in an AS. Each area may have a number of area border routers connected to the backbone area. A big AS may be divided into a number of OSPF areas. The TE link state in one area may not be distributed to other areas. Thus, there may be a number of issues when an AS or an area is split further into multiple areas.

Under current practice, it may be difficult to establish an MPLS TE LSP crossing multiple areas. In general, a TE path crossing multiple areas may be computed by using collaborating path computation elements (PCEs) through the PCE communication protocol (PCEP), which may not be easy for operators to configure since manual configuration of the sequence of domains is required. Further, the current PCE method may not guarantee that the path found would be optimal. Further, under current practice, TE information about one or more links inside the zone may require distribution and storage in a router. This may lead to large TE link state databases in routers, which may not be ideally scalable.

SUMMARY

In one aspect, the disclosure includes a method for summarizing TTZ information, comprising computing a TE link state for every TE link internal to a TTZ from a root node to one or more non-root edge nodes, wherein the TE link state comprises the maximum bandwidth of the link, summarizing the computed TE link state information and storing the summary in a memory, and distributing at least a portion of the information in the summary to at least one neighboring node external to the TTZ connected to the root node via an external link.

In another aspect, the disclosure includes an apparatus comprising a processor configured to compute the link state information for every TE link internal to a TTZ from a root node to one or more non-root edge nodes, wherein the link state comprises the maximum bandwidth of the link, compute the link state information for every TE link internal to the TTZ from one or more nodes internal to the TTZ to the root node or to the one or more non-root edge nodes, wherein the link state comprises the maximum bandwidth of the link, summarize the computed TE link state information in a table, distribute at least a portion of the information in the table to at least one neighboring node external to the TTZ and connected to the root node via an external link, and establish an E2E TE LSP comprising a first node external to the TTZ, the root node, an edge node of the TTZ, and a second node external to the TTZ, wherein the first node uses at least a portion of the distributed information to get, set up, and transfer data over the portion of the path to the root node, wherein the root node uses TTZ-internal links to get, set up, and transfer data over the portion of the path to the edge node, and wherein the edge node uses TTZ-external links to get, set up, and transfer data over the portion of the path to the second node.

In yet another aspect, the disclosure includes a computer program product comprising computer executable instructions stored on a non-transitory medium that when executed by a processor cause the processor to compute the link state information for every TE link internal to a TTZ from a root node to one or more non-root edge nodes, wherein the link state comprises the maximum bandwidth of the link, summarize the computed TE link state information in a table, distribute at least a portion of the information in the table to at least one neighboring node external to the TTZ and connected to the root node via an external link, and establish an E2E TE LSP comprising a first node external to the TTZ, the root node, an edge node of the TTZ, and a second node external to the TTZ, wherein the first node uses at least a portion of the distributed information to get, set up, and transfer data over the portion of the path to the root node, wherein the root node uses TTZ-internal links to get, set up, and transfer data over the portion of the path to the edge node, and wherein the edge node uses TTZ-external links to get, set up, and transfer data over the portion of the path to the second node.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure includes systems and methods for summarizing TE information in a zone for hiding its TE link state information and facilitating establishing a MPLS TE LSP crossing multiple zones. Rather than identifying a path using multiple short hops, e.g., by daisy-chaining paths through multiple PCEs, this disclosure presents an ingress node and an egress node of a zone, e.g., a TTZ, with beginning and ending edge node and link bandwidth information and shielding the path through internal nodes from routers outside the zone. This disclosure includes using a TTZ-based approach to reduce the number of link states, e.g., summary link-state advertisements (LSAs), to be distributed to neighboring and/or adjacent routers and/or nodes.

Figure 1:
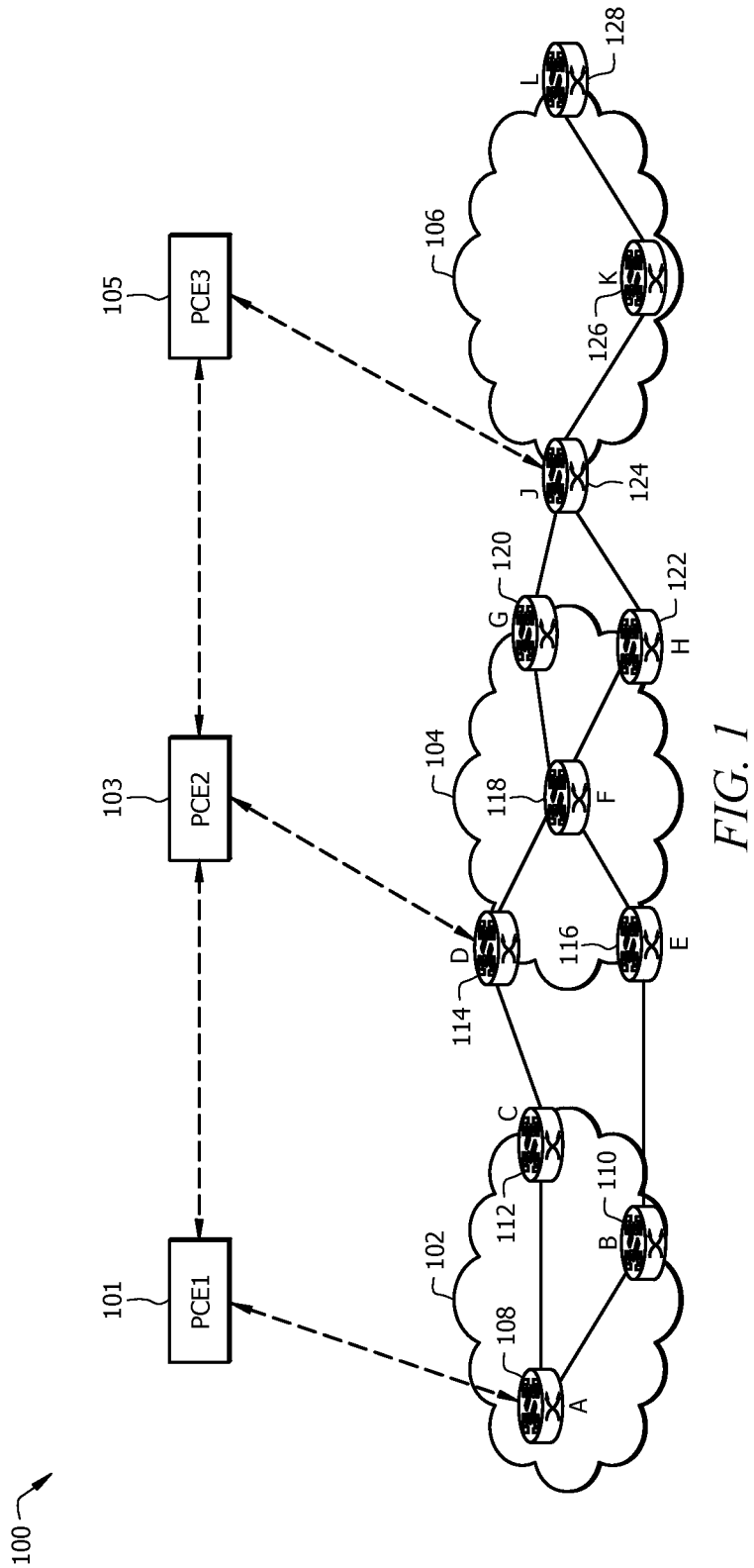
FIG. 1 is a schematic diagram of a network system having PCEs.

Conventional methods of setting up an E2E TE LSP may utilize PCEs to calculate E2E TE LSP paths, e.g., by calculating the node-to-node path for new connections in a network. PCE-based approaches may be complex and may require many steps to establish an E2E TE LSP path. FIG. 1 is a schematic diagram of a network system 100 having PCEs 101 (labeled PCE1), 103 (labeled PCE2), and 105 (labeled PCE3) associated with areas 102, 104, and 106, e.g., Open Shortest Path First (OSPF) areas, respectively. The dashed lines may indicate a communications and/or control path to or from a PCE. A PCE may be a path computational server or an application running on a server, and may compute paths through OSPF areas. Network system 100 comprises network nodes 108-128 (labeled A-L, respectively), which may be any components configured to route and/or store traffic, e.g., routers, switches, servers, etc. The solid lines may indicate a data path for communication between non-PCE nodes. Nodes 108-128 may be connected as shown in FIG. 1. Area 102 comprises nodes 108-112, area 104 comprises nodes 114-122, and area 106 comprises nodes 124-128.

Figure 2:
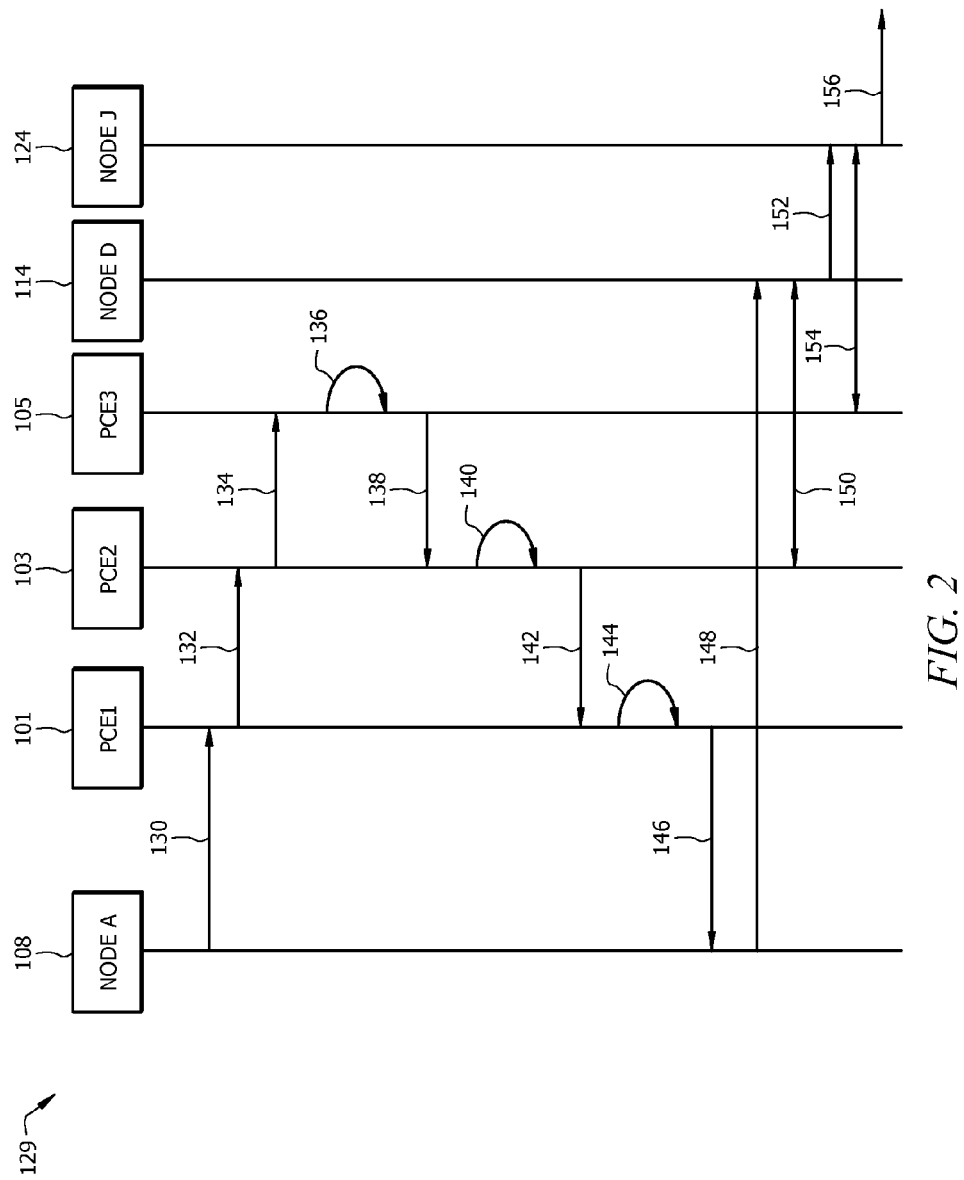
FIG. 2 is a protocol diagram for FIG. 1 describing setting up an E2E TE LSP using multiple PCEs.

FIG. 2 is a protocol diagram describing a process 129 for setting up an E2E path from node A to node L across multiple areas associated with PCE1, PCE2, and PCE3. Process 129 may begin at step 130 with node A sending a path request to PCE1 identifying node L as the destination node. At step 132, PCE1 may send a request for a path from node A to node L to PCE2. At step 134 PCE2 may send a request to PCE3 requesting a path from node A to node L. An operator (not pictured) may inform PCE1 that a path from node A to node L will cross areas 102, 104, and 106, thereby notifying PCE1 and PCE2 of the PCE to which requests must be forwarded. At step 136, PCE3 may find a path segment crossing nodes J-K-L. PCE3 may hide or shield the internal pathway using a key, e.g., key1. At step 138, PCE3 may inform PCE2 of the necessary path segment to traverse area 106, e.g., by passing {J, key1} to PCE2. At step 140, PCE2 may find a path segment across area 104 from node D to node J, e.g., path D-F-G. PCE2 may hide or shield the internal pathway using a key, e.g., key2, and may inform PCE1 of the necessary path segment to traverse area 104, and area 106, e.g., by passing {D, key2, J, key1} to PCE1 at step 142. At step 144, PCE1 may find a path segment across area 102 from node A to node D, e.g., path A-C. Once identified, PCE1 may notify node A of the transmission path at step 146. At step 148, node A may use a signaling protocol to set up an E2E path using the transmission path information {A, C, D, key2, J, key1}. When node D receives a path information {D, key2, J, key1} from area 102 via node C, node D may communicate with PCE2 at step 150 to decode the key2 element and identify the appropriate transmission path through area 104 to node J stored under key2 at PCE2, e.g., path D-F-G. At step 152, node J may receive a path information {J, key1}. Upon receipt, at step 154 node J may communicate with PCE3 to decode the key1 element and identify the appropriate transmission path through area 106 to node L stored under key1 at PCE1, namely, path J-K-L. At step 156, node J may establish the E2E TE LSP path to node L (not pictured).

Figure 3:
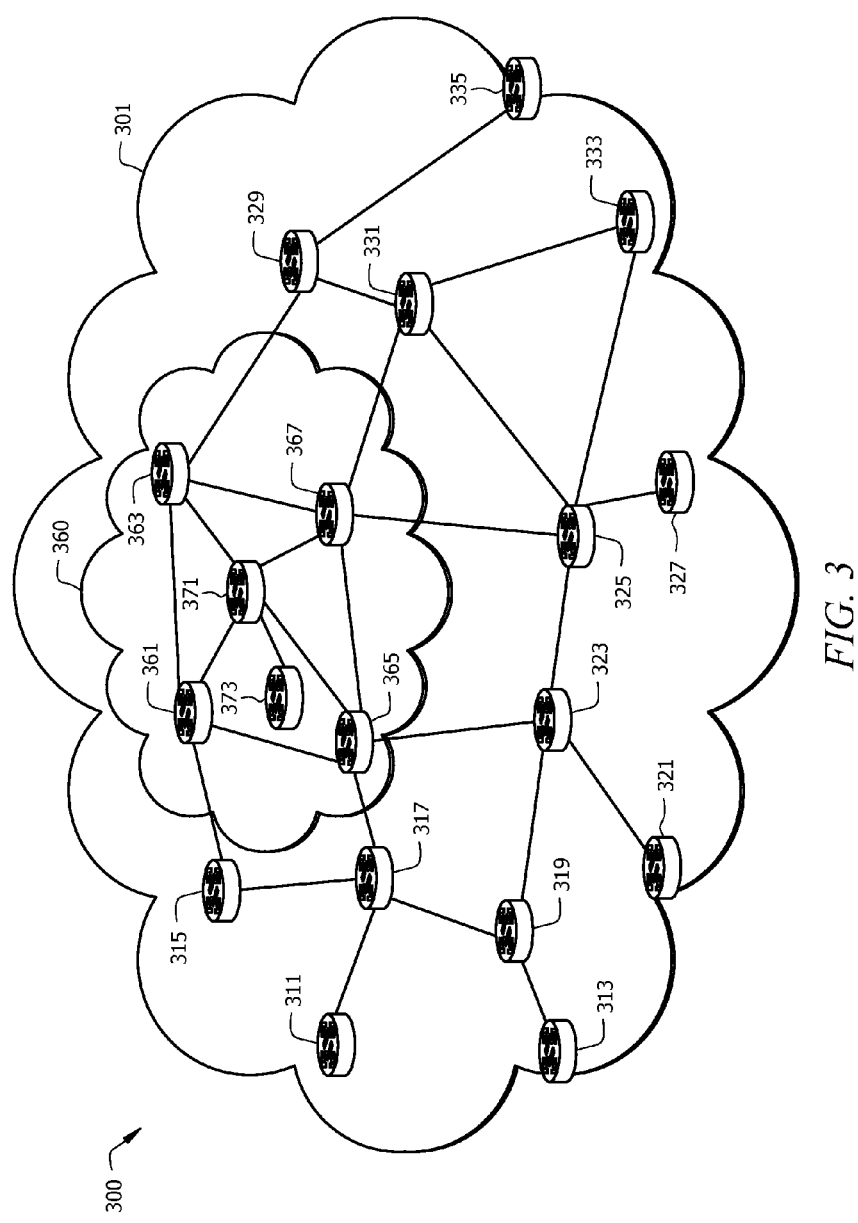
FIG. 3 is a schematic diagram of one embodiment of a network system.

FIG. 3 is a schematic diagram of one embodiment of a network system 300, where a plurality of components may be connected. The network system 300, e.g., the network system 100 of FIG. 1, comprises an OSPF area 301, which includes a simple TTZ 360. The area 301 may comprise a plurality of area border nodes, including a first area border node 313 and a second area border node 335, where each area border node may be connected to another OSPF area (not shown). Additionally, the area 301 may comprise a plurality of area internal nodes 311, 315, 317, 319, 321, 323, 325, 336, 329, 331, and 333, which are not connected to a node outside of the area 301. The nodes of FIG. 3 may be substantially the same as the non-PCE nodes of FIG. 1

The simple TTZ 360 comprises a plurality of TTZ edge nodes 361, 363, 365 and 367. Each TTZ edge node is connected to at least one node outside of the TTZ 360. For instance, node 361 is a TTZ edge node since it is connected to the area internal node 315, which is outside of TTZ 360. In addition, the TTZ 360 comprises a plurality of TTZ-internal nodes 371 and 373. A TTZ-internal node may be a node that is not connected to any node outside of the TTZ 360. For instance, node 371 may be a TTZ-internal node since it is not connected to any node outside of the TTZ 360 and is only connected to nodes 361, 363, 365, 367, and 373 inside the TTZ 360.

The TTZ 360 may hide the information inside the TTZ from the outside, e.g., by providing information, e.g., LSA summaries or obscured data tables, which omit internal nodes. This feature is disclosed in the '592 application and the '481 application. In an embodiment, the TTZ 360 may not distribute to a node outside of the TTZ any internal information about the TTZ, which includes the information about the TTZ-internal nodes and a link(s) between any two TTZ nodes. For instance, the TTZ 360 may not send the information about TTZ-internal node 371 or the link between TTZ node 371 and 365 to any node outside of the TTZ 360 in the area 301.

The TTZ 360 may have a TTZ identifier (ID), which may be a router ID. Router IDs that are assigned to TTZs (such as the TTZ 360) may be referred to herein as TTZ IDs, and may be configured on each link within the relevant TTZ such that the interconnected TTZ nodes, e.g., nodes on either side of the link, recognize that the link is inside the TTZ. In other words, configuring the TTZ ID on the link may indicate and/or specify that the link is a TTZ link. In an embodiment, a TTZ ID may be configured on a link by associating the link with the TTZ ID in each interconnected node. For example, configuring the TTZ in node 361 on the link between nodes 361 and 365 may indicate that this link is inside the TTZ from node 361's point of view, and configuring the TTZ in node 365 on the link between nodes 365 and 361 may indicate that this link is inside the TTZ from node 365's point of view. This information may be stored in a table, e.g., a link table, in each of the TTZ-internal nodes.

The TTZ 360 may be formed after every link inside the TTZ is configured with the same TTZ ID on both sides of the link. In an embodiment, the same TTZ ID may be configured on the links between nodes 361 and nodes 363 and 365, between nodes 365 and 367, between nodes 367 and 363, between nodes 363 and 361, and the links between node 371 and 361, 363, 365, 367, and 373, respectively.

From a node outside of the TTZ, the TTZ 360 may be "seen" (e.g., viewed, perceived, or otherwise recognized), e.g., through one or more LSA summaries, as a group of connected TTZ edge nodes. In one embodiment, the group of TTZ edge nodes may be fully connected. For instance, node 315, which is outside of the TTZ and connected to the TTZ through TTZ edge node 361, may see the TTZ 360 as a group of TTZ edge nodes: 361, 363, 365 and 367. These four TTZ edge nodes are fully connected. The 'cost' of transmission from one edge node to another edge node may be the cost of the shortest path between these two nodes.

In addition, a node outside of the TTZ may see TTZ edge nodes having normal connections to the nodes outside of the TTZ. For example, node 315 may see four TTZ edge nodes 361, 363, 365 and 367. Nodes 361 and 363 may have the normal connections to nodes 315 and 329 respectively. Node 365 may have normal connections to nodes 317 and 323. Node 367 may have normal connections to nodes 325 and 331. Thus, from the perspective of an edge node or router, such as the edge node 361, the edge router may be regarded as connected to each of a plurality of neighboring or adjacent routers via a link, wherein the plurality of routers comprises a first neighboring router, e.g., an external router, and a second neighboring router, e.g., an internal router. The edge router may comprise a first port configured to connect to the first neighboring router via a first link, and a second port configured to connect to the second neighboring router via a second link. The edge router may further comprise a topology graph/table configured to store information, e.g., link state and/or LSA information, regarding the first and second neighboring routers, and the first and second links. In an embodiment, a topology graph/table stored in the first neighboring router does not contain any information regarding the second neighboring router or the second link, which is an internal link. In another embodiment, a topology graph/table stored in the second neighboring router may contain information regarding the first neighboring router and the first link, which is an external link. Further, the edge router may be configured to generate a first LSA to describe the first link and the second link, and send the first LSA to the second neighboring router. The edge router may be further configured to generate a second LSA to describe the first link and one or more additional links between the edge router and other edge routers of the TTZ 360. Some or all of the additional links may be virtual links and each of which may indicate an indirect connection between two edge routers, such as the edge node 361 and the edge node 367 (not directly connected). In one embodiment, a cost of a link between two edge routers may be the cost of the shortest path between the two edge routers. The edge router may be configured to send the second LSA to the first neighboring router. In another embodiment, a forwarding adjacency may be established between every two edge routers, e.g., a pair of edge routers, and a cost of a link between the two edge nodes may be set to a predetermined or fixed value, such as one.

Figure 4:
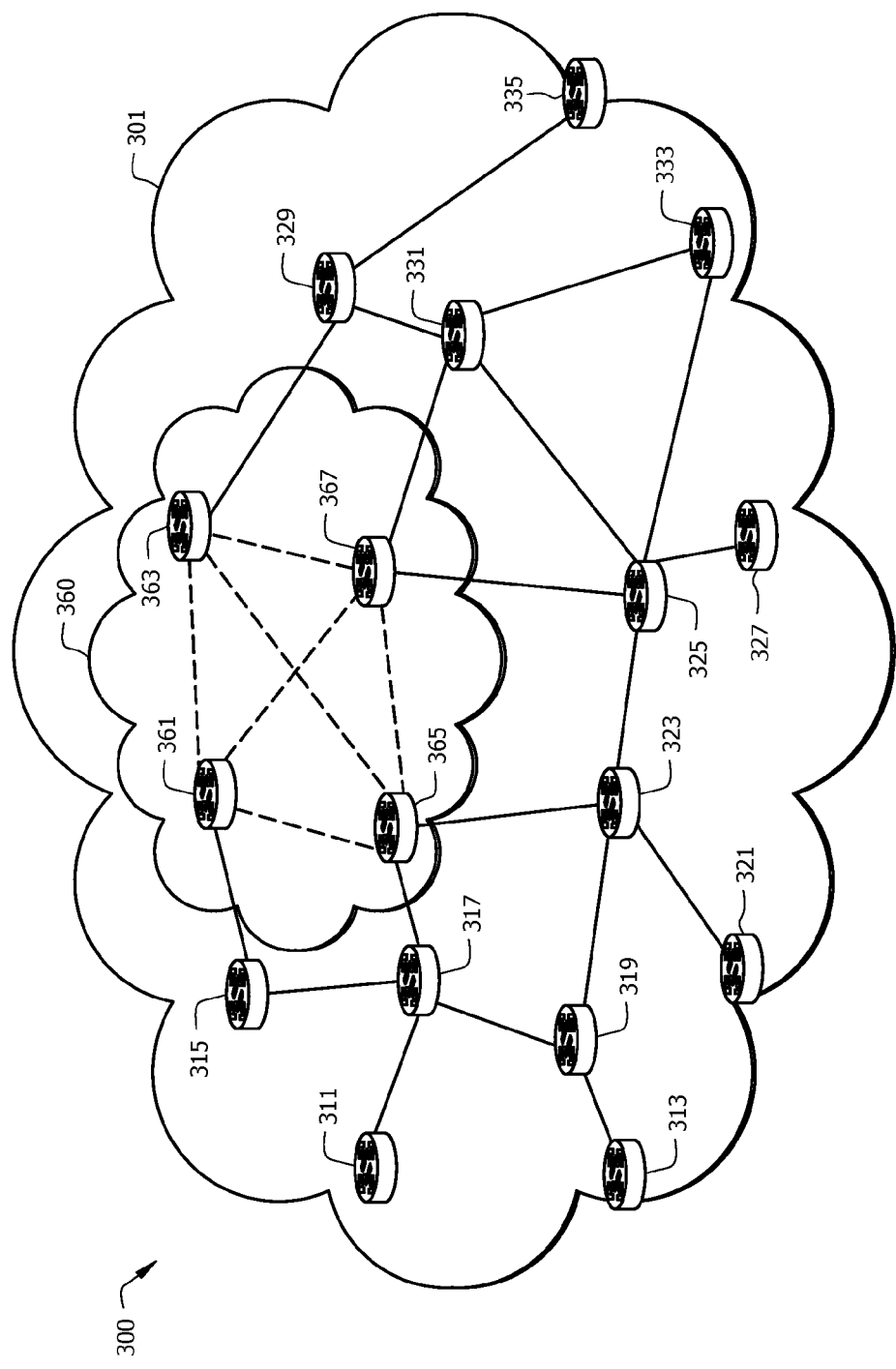
FIG. 4 is a schematic diagram of another embodiment of a network system.

FIG. 4 is a schematic diagram of an embodiment of a network system 300 comprising an Open Shortest Path First (OSPF) area 301 with a zone 360 virtualized as a group of fully connected edge routers 361, 363, 365 and 367. The zone 360 may hide the information inside the zone 360, e.g., node 373, from the remaining parts of area 301, e.g., the section of area 301 outside the zone 360. Instead, the zone 360 may summarize the TE link state information of the zone 360 and distribute the summary information to the routers outside of the zone 360. In one embodiment, the zone 360 is summarized as a number of TE links, each of which connects two edge nodes of the zone 360. The zone 360 may be summarized as six TE links as illustrated in FIG. 4, which may be the links between node 361 and nodes 363/365/367, between node 363 and nodes 365/367, and between node 365 and node 367. The bandwidth of a TE link from an edge node A of the zone 360, e.g., edge node 361, to another edge node B of the zone 360, e.g., edge node 363, may be the bandwidth of a path with the maximum bandwidth among all of the possible paths from node A to node B. In another embodiment, the zone 360 may be summarized, e.g., in a table or set of LSAs, as a number of TE links, each of which connects one edge node of the zone 360 to a node to be exposed to outside of the zone 360, which may be another edge node of the zone 360 and a node inside the zone 360 to be exposed to outside of the zone 360. The bandwidth of a TE link from an edge node C of the zone 360, e.g., edge node 365, to another node D, e.g., edge node 367, of the zone 360 may be the maximum bandwidth among the bandwidths of all possible paths from node C to node D.

Virtualizing zone 360 as a group of fully-connected edge routers permits a node, e.g., node 315 and/or node 361, to compute an E2E TE LSP path crossing multiple zones in a way which is the same as to compute a path in one area. Consequently, disclosed systems and methods enable the elimination of PCEs from E2E TE LSPs.

Figure 5:
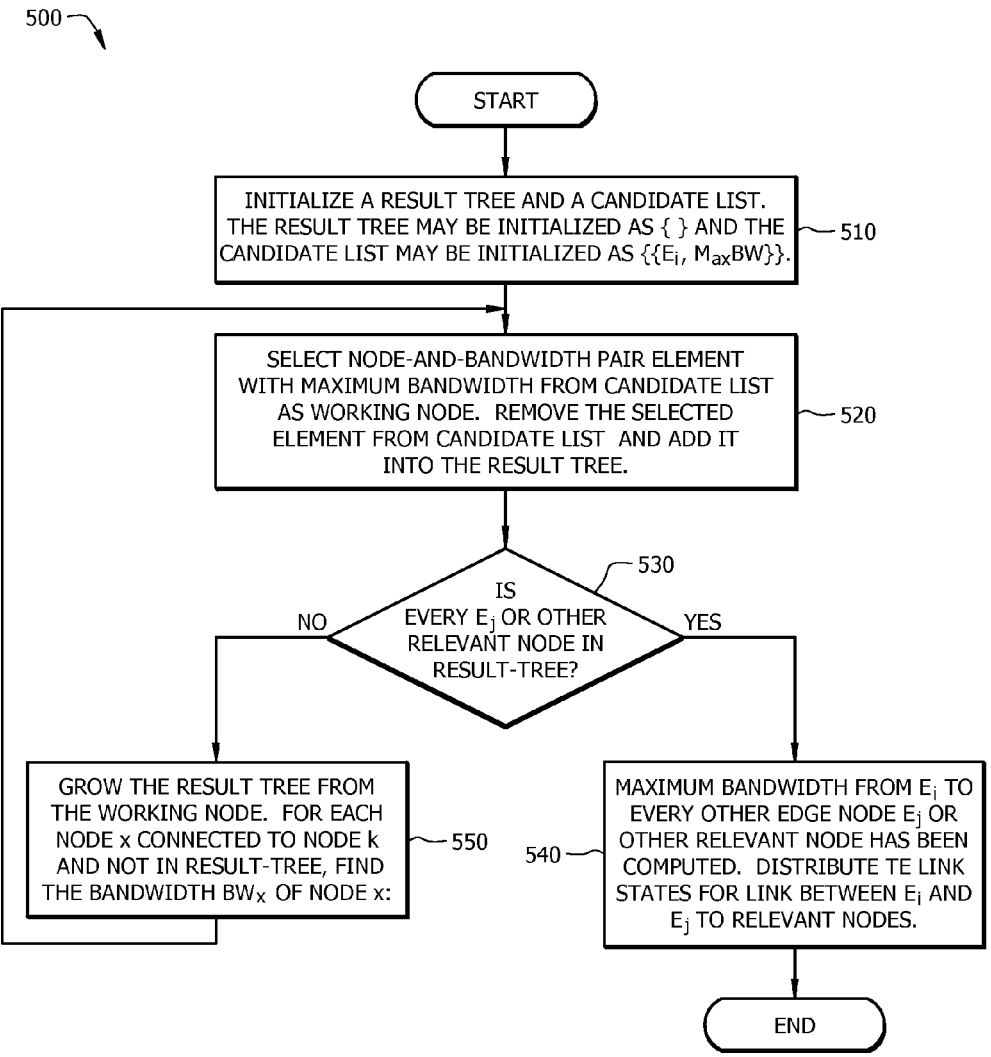
FIG. 5 is flowchart for one embodiment of a method for computing the bandwidth for a TE link from an edge node of a zone to another edge node.

FIG. 5 is flowchart for one embodiment of a method 500 for computing the bandwidth for a TE link from an edge node, e.g., edge node 361 of FIG. 4, of a zone, e.g., zone 360 of FIG. 4, to another edge node, e.g., edge node 363 of FIG. 4, of the zone or a node, e.g., node 371 of FIG. 3, inside the zone to be exposed to one or more nodes outside the zone. The method 500 may start at block 510 with initializing a result tree as empty and initializing a candidate list to contain one element, namely, a pair of a root node ($E_i$), wherein the root is the beginning edge node of the zone, e.g., edge node 361 of FIG. 4, and a maximum bandwidth (MaxBW), wherein the MaxBW is the maximum bandwidth which may be accommodated in the zone. After initialization, the candidate list may comprise $\{E_i, \text{MaxBW}\}$ and the result tree may comprise $\{\}$. Result tree elements may have the same node-and-bandwidth pair form as candidate list elements. Following one or more recursive iterations of the method 500 set forth below, the candidate list may be further populated data for node-and-bandwidth pairs for each non-root edge node ($E_j$), for zone-internal nodes which are to be exposed to one or more zone-external nodes, and/or for exclusively zone-internal nodes until every non-root node in the zone and an associated bandwidth (e.g., the bandwidth on the path from the root to the node-and-bandwidth pair node) may be found in node-and-bandwidth pair elements in a result tree.

At block 520, the method 500 may select a node-and-bandwidth pair element, e.g., $\{E_i, MaxBW\}$, from the initialized candidate list to function as the "working node," e.g., $E_i$=working node k. The working node may be selected based on the node-and-bandwidth pair with the maximum bandwidth. Selecting the working node node-and-bandwidth pair from the candidate list may remove the selected element from the candidate list and may add the element into the result list, also called a result tree.

At block 530, the method 500 may check whether every $E_j$ and every node in the zone to be exposed to outside of the zone is in the result tree. If they are in the result tree, the maximum bandwidth for every TE link from the root $E_i$ to non-root edge node $E_j$ or a node inside the zone to be exposed to outside of the zone has been computed, and the method 500 may distribute the TE link state containing the maximum bandwidth to nodes outside of the TTZ at block 540 and end. In some embodiments, the method 500 may also distribute the TE link state to one or more nodes inside the zone. Upon completing step 540, nodes adjacent to the TTZ may have the information necessary to establish an E2E TE LSP across the one or more TTZs according to customary E2E TE LSP conventions.

If the evaluation at block 530 shows that every $E_j$ and every node in the zone to be exposed to outside of the zone is not in the result tree, the method 500 may proceed to block 550. At block 550, the method 500 may try to grow the result tree from the "working node" selected at block 520. Method 500 may begin this process by considering every node x connected to the working node k and not in the result tree. For each node x, the bandwidth $BW_x$ of node x may be computed as $BW_x=\min(BW_k, BW_{k-x})$ (e.g., $BW_x$ is set to the lesser of $BW_k$ and $BW_{k-x}$), where $BW_k$ is the maximum bandwidth from root to node k and $BW_{k-x}$ is the bandwidth of the link from node k to node x. The node x with the bandwidth $BW_x$ is merged into the candidate list. If node x is not in the candidate list, then the method 500 may add the node-and-bandwidth pair $\{x, BW_x\}$ into the candidate list. If there is an element $\{x, BW_{x0}\}$ in the candidate list, if $BW_x$ is greater than $BW_{x0}$ then the method 500 replaces $\{x, BW_{x0}\}$ in the candidate list with $\{x, BW_x\}$. If $BW_x$ is not greater than $BW_{x0}$ then the method 500 retains the original node-and-bandwidth pair $\{x, BW_{x0}\}$. After repeating the process for every node x connected to node k and not in the result tree, method 500 may iteratively return to step 520 until method 500 reaches block 540 and ends.

Figure 6:
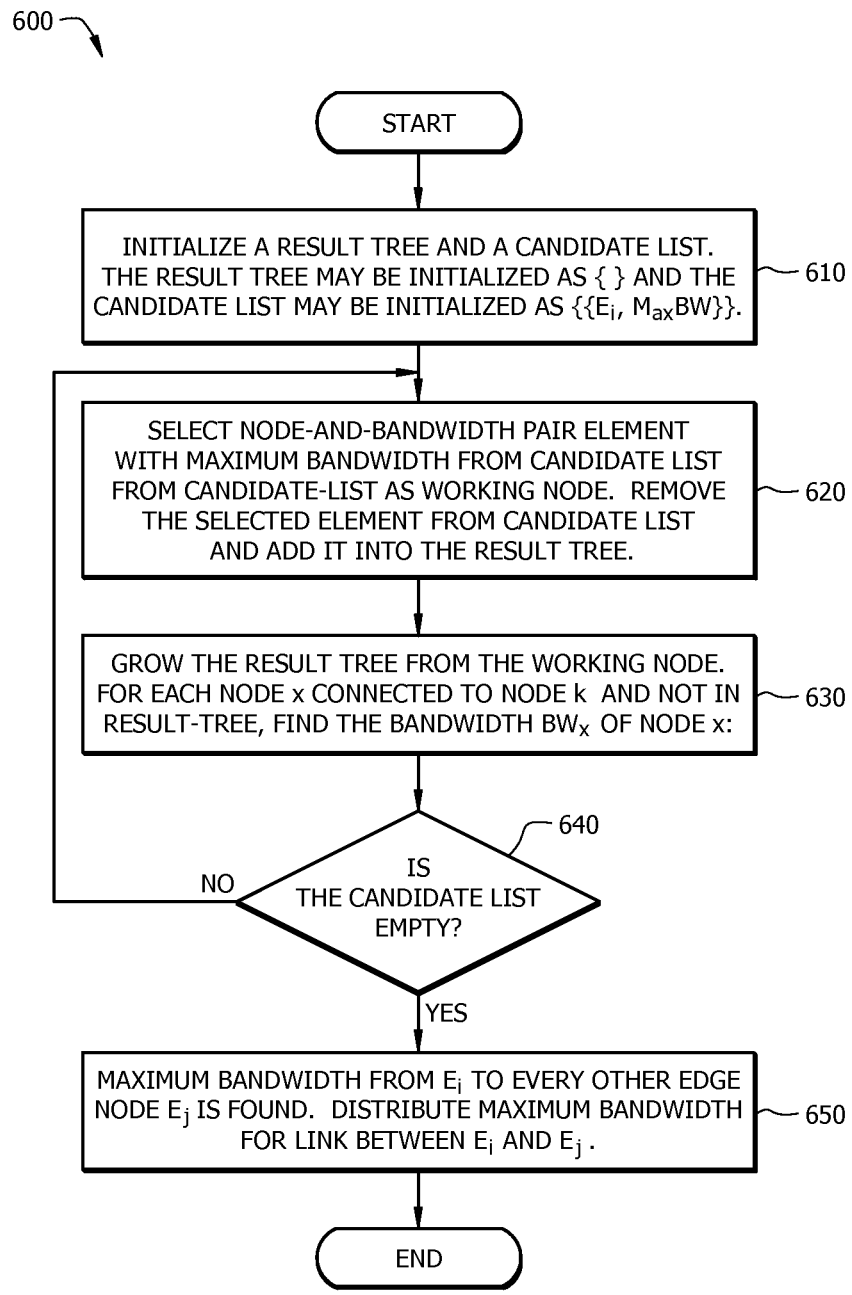
FIG. 6 is a flowchart for another embodiment of a method for computing the bandwidth for a TE link from an edge node of a zone to another edge node.

FIG. 6 is flowchart for an embodiment of another method 600 for computing the bandwidth for a TE link. The TE link of method 600 may run from an edge node, e.g., edge node 361 of FIG. 4, of a zone, e.g., zone 360 of FIG. 4, to another edge node of the zone, e.g., edge node 363 of FIG. 4. Alternately, the TE link of method 600 may run from a node inside the zone, e.g., node 373 of FIG. 3, to one or more nodes outside the zone, e.g., node 331 of FIG. 3. The method 600 may be implemented by an edge node of the zone to compute the bandwidth for a TE link from the edge node of the zone to another edge node of the zone or a node inside the zone to be exposed to outside. The method 600 may start at block 610 with initializing a candidate list to contain one element $\{E_i, MaxBW\}$ and initializing a result tree as empty. The candidate list may comprise a pair of a node-and-bandwidth pair. The node of the pair may be root node $E_i$, wherein the root is the beginning edge node of the zone, e.g., edge node 361 of FIG. 4. The bandwidth of the pair may be a MaxBW, wherein the MaxBW is the maximum bandwidth which may be accommodated in the zone. After initialization, the result tree may be { }. Result tree elements may have the same node-and-bandwidth pair form as candidate list element, which may each have the same form as node-and-bandwidth pairs in the candidate list in the method 500 of FIG. 5.

At block 620, the method 600 may select the node with the highest bandwidth from the node-and-bandwidth pair in the candidate list to use as the working node, e.g., $E_i$=working node k. The method 600 may remove the selected element from the candidate list and may add the selected element to the result tree.

At block 630, the method 600 may grow the result tree from the working node k. Method 600 may begin this process by considering every node x connected to the working node k and not in the result tree. For each node x, the bandwidth $BW_x$ of node x may be computed as $BW_x=\min(BW_k, BW_{k-x})$ (e.g., $BW_x$ is set to the lesser of $BW_k$ and $BW_{k-x}$), where $BW_k$ is the maximum bandwidth from root to node k and $BW_{k-x}$ is the bandwidth of the link from node k to node x. The node x with the bandwidth $BW_x$ is merged into the candidate list. If node x is not in the candidate list, then the method 600 may add the node-and-bandwidth pair $\{x, BW_x\}$ into the candidate list. If there is an element $\{x, BW_{x0}\}$ in the candidate list, if $BW_x$ is greater than $BW_{x0}$ then the method 600 replaces $\{x, BW_{x0}\}$ in the candidate list with $\{x, BW_x\}$. If $BW_x$ is not greater than $BW_{x0}$ then the method 600 retains the original node-and-bandwidth pair $\{x, BW_{x0}\}$.

After repeating the process for every node x connected to node k and not in the result tree, method 600 may check whether the candidate list is empty at block 640, e.g., candidate list={ }. If the candidate list is not empty, the method 600 may iteratively return to step 620 until the evaluation at block 640 shows the candidate list is empty. If the candidate list is empty, the maximum bandwidth for every TE link from the root $E_i$ to non-root edge node $E_j$ or a node inside the zone to be exposed to outside of the zone has been computed, and at block 650 the method 600 may distribute the TE link state containing the maximum bandwidth for every TE link to nodes outside of the TTZ. In some embodiments, the method 600 may also distribute the TE link state to one or more nodes inside the zone. Upon completing step 650, edge nodes adjacent to the TTZ may have the information necessary to establish an E2E TE LSP across the one or more TTZs according to customary E2E TE LSP conventions.

Figure 7:
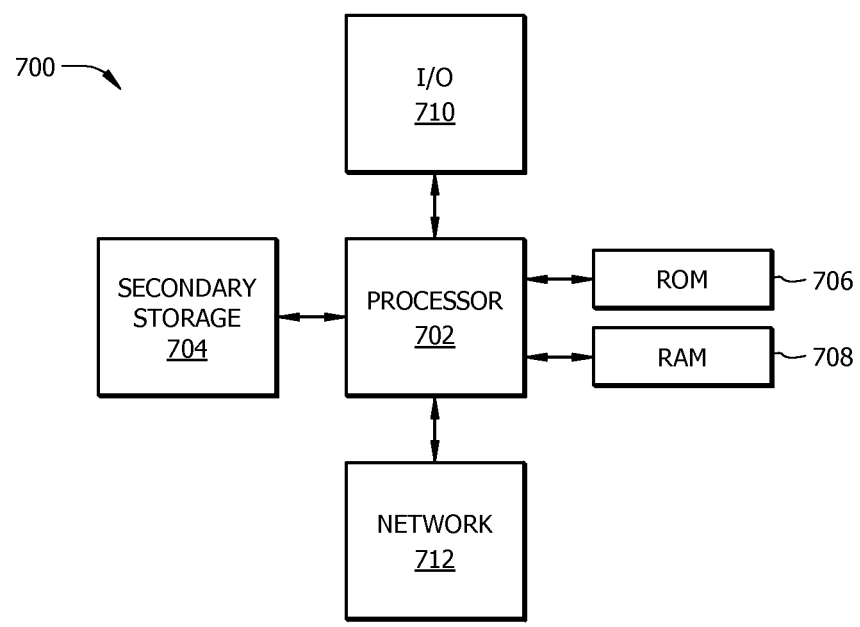
FIG. 7 is a schematic diagram of an embodiment of a network component.

At least some of the features/methods described in the disclosure may be implemented in a general computing device and/or a network apparatus or component, such as a computer or network component with sufficient processing power, memory resources, and network throughput capability to handle the necessary workload placed upon it. For instance, the features/methods of the disclosure may be implemented using hardware, firmware, and/or software installed to run on hardware. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, e.g., cameras, microphones, display screens, etc., and network connectivity devices 712. The processor 702 may be implemented as one or more CPU chips, or may be part of one or more application specific integrated circuits (ASICs) and/or digital signal processors (DSPs).

The secondary storage 704 is typically comprised of one or more disk drives or erasable programmable ROM (EPROM) and is used for non-volatile storage of data. Secondary storage 704 may be used to store programs that are loaded into RAM 708 when such programs are selected for execution.

The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

It is understood that by programming and/or loading executable instructions onto the general computing device 700, at least one of the processor 702, the ROM 706, and the RAM 708 are changed, transforming the general computing device 700 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for summarizing topology transparent zone (TTZ) traffic engineering (TE) information, comprising:
   computing a TE link state information for every TE link internal to a TTZ from a root node to one or more non-root edge nodes, wherein the TE link state information for every TE link comprises a maximum bandwidth of a TE link;
   summarizing the computed TE link state information; and
   distributing at least a portion of the TE link state information in the summary to at least one neighboring node external to the TTZ connected to the root node,
   wherein computing the TE link state information comprises:
      establishing a first list of one or more node-and-bandwidth pairs, wherein each node-and-bandwidth pair comprises a TTZ node, wherein each node-and-bandwidth pair comprises a maximum utilizable bandwidth on a TE link from the root node to a node of the node-and-bandwidth pair, and wherein a node-and-bandwidth pair containing the root node comprises the root node and a predefined maximum bandwidth;
      establishing a second list;
      selecting a node-and-bandwidth pair of the one or more node-and bandwidth pairs from the first list based on bandwidth;
      adding the selected node-and-bandwidth pair to the second list;
      removing the selected node-and-bandwidth pair from the first list;
      expanding the first list based on the selected node-and-bandwidth pair; and
      repeating the selection, the addition, the removal, and the expansion until either the first list contains no node-and-bandwidth pairs, or every edge node of the TTZ is present in a node-and-bandwidth pair on the second list.

2. The method of claim 1, further comprising establishing an end-to-end (E2E) TE label switching path (LSP), wherein the E2E TE LSP comprises a first node external to the TTZ, the root node, and a particular edge node or an internal node of the TTZ, wherein a portion of the path from the first node to the root node is selected based on the distributed TE link state information, and wherein a portion of the path from the root node to the particular edge node or the internal node is selected based on the TE link state information associated with the links internal to the TTZ.

3. The method of claim 2, wherein the E2E TE LSP crosses two or more TTZs, and wherein each TTZ comprises a summarized TE link state information table.

4. The method of claim 1, wherein expanding the first list based on the selected node-and-bandwidth pair with a node k and a bandwidth $BW_k$ comprises:
 computing a bandwidth $BW_x$ for every node x connected to the node k and not in the second list, wherein the bandwidth $BW_x$ is the lesser of the bandwidth $BW_k$ and a bandwidth of a TE link from the node k to the node x;
 adding, when the first list contains no node-and-bandwidth pairs comprising node x, a node-and-bandwidth pair $\{x, BW_x\}$ into the first list; and
 replacing, when the first list contains a node-and-bandwidth pair comprising node x and a bandwidth $BW_{x0}$, the node-and-bandwidth pair $\{x, BW_{x0}\}$ in the first list with $\{x, BW_x\}$ if the bandwidth $BW_x$ is greater than $BW_{x0}$.

5. The method of claim 1, further comprising computing TE link state information for every TE link internal to the TTZ from an internal node of the TTZ to the one or more non-root edge nodes,
 wherein the TE link state information for every TE link comprises a bandwidth of a TE link, and
 wherein the bandwidth for every TE link is the bandwidth of a TE link from the internal node to an edge node of the one or more non-root edge nodes with a maximum bandwidth among a plurality of bandwidths of TE links from the internal node to the edge node of the one or more non-root edge nodes.

6. The method of claim 1, wherein bandwidth in the selected node-and-bandwidth pair is the largest among bandwidths of the one or more node-and-bandwidth pairs in the first list.

7. An apparatus comprising:
 a hardware processor configured to:
  compute traffic engineering (TE) link state information for every TE link internal to a topology transparent zone (TTZ) from a root node to one or more non-root edge nodes, wherein the TE link state information for every TE link comprises a maximum bandwidth of a TE link;
  compute TE link state information for every TE link internal to the TTZ from one or more internal nodes of the TTZ to the root node or to the one or more non-root edge nodes, wherein the TE link state information for every TE link comprises a maximum bandwidth of a TE link, wherein computing the TE link state information comprises:
   establishing a first list of one or more node-and-bandwidth pairs, wherein a node in each node-and-bandwidth pair is associated with one of the one or more non-root edge node or one of the one or more nodes internal to the TTZ, and wherein bandwidth in each node-and-bandwidth pair is a maximum utilizable bandwidth on a TE link from the root node to the node of the node-and-bandwidth pair;
   establishing a second list;
   selecting a node-and-bandwidth pair of the one or more node-and bandwidth pairs from the first list based on bandwidth;
   adding the selected node-and-bandwidth pair to the second list;
   removing the node-and-bandwidth pair from the first list;
   expanding the first list based on the selected node-and-bandwidth pair; and
   repeat the selecting, the adding, the removing and the expanding node-and-bandwidth pairs until either the first list contains no node-and-bandwidth pairs, or every edge node of the TTZ is present in a node-and-bandwidth pair on the second list;
  summarize, in a table, the computed TE link state information for every TE link internal to the TTZ from the root node and the computed TE link state information for every TE link internal to the TTZ from the one or more internal nodes;
  distribute at least a portion of the computed TE link state information in the table to at least one neighboring node external to the TTZ and connected to the root node via an external link; and
  establish an end-to-end (E2E) TE label switching path (LSP) comprising a first node external to the TTZ, the root node, a particular edge node of the TTZ, and a second node external to the TTZ, wherein the first node uses at least a portion of the distributed TE link state information to get, set up, and transfer data over a portion of a path to the root node, wherein the root node uses TTZ-internal links to get, set up, and transfer data over the portion of the path to the particular edge node, and wherein the edge node uses TTZ-external links to get, set up, and transfer data over the portion of the path to the second node.

8. The apparatus of claim 7, wherein the first list initially comprises the selected node-and-bandwidth pair, wherein the node in the selected node-and-bandwidth pair is the root node, and wherein bandwidth in the selected node-and-bandwidth pair is a predefined maximum bandwidth.

9. The apparatus of claim 7, wherein bandwidth in the selected node-and-bandwidth pair is the largest among bandwidths of the one or more node-and-bandwidth pairs in the first list.

10. A computer program product comprising computer executable instructions stored on a non-transitory medium that when executed by a hardware processor cause the processor to:
 compute traffic engineering (TE) link state information for every TE link internal to a topology transparent zone (TTZ) from a root node to one or more non-root edge nodes, wherein the TE link state information for every TE link comprises a maximum bandwidth of a TE link, wherein computing the TE link state information comprises:
  establishing a first list of one or more node-and-bandwidth pairs, wherein a node in each node-and-bandwidth pair is associated with one of the one or more non-root edge nodes or one or more nodes internal to the TTZ, and wherein bandwidth in each node-and-bandwidth pair is a maximum utilizable bandwidth on a TE link from the root node to the node of the node-and-bandwidth pair;
  establishing a second list;
  selecting a node-and-bandwidth pair of the one or more node-and bandwidth pairs from the first list based on bandwidth;
  adding the selected node-and-bandwidth pair to the second list;

removing the node-and-bandwidth pair from the first list;
expanding the first list based on the selected node-and-bandwidth pair; and
repeat the selecting, the adding, the removing, and the expanding node-and-bandwidth pairs until either the first list contains no node-and-bandwidth pairs, or every edge node of the TTZ is present in a node-and-bandwidth pair on the second list;
summarize the computed TE link state information in a table;
distribute at least a portion of the TE link state information in the table to at least one neighboring node external to the TTZ and connected to the root node via an external link; and
establish an end-to-end (E2E) TE label switching path (LSP) comprising a first node external to the TTZ, the root node, a particular edge node of the TTZ, and a second node external to the TTZ, wherein the first node uses at least a portion of the distributed TE link state information to get, set up, and transfer data over a portion of the path to the root node, wherein the root node uses TTZ-internal links to get, set up, and transfer data over the portion of the path to the edge node, and wherein the particular edge node uses TTZ-external links to get, set up, and transfer data over the portion of the path to the second node.

11. The computer program product of claim 10, wherein the instructions further cause the processor to compute the TE link state information for every TE link internal to the TTZ from the one or more nodes internal to the TTZ to the root node or to the one or more non-root edge nodes, and wherein the TE link state information for every TE link comprises a maximum bandwidth of a TE link.

12. The computer program product of claim 10, wherein the first list initially comprises the selected node-and-bandwidth pair, wherein a node in the selected node-and-bandwidth pair is the root node, and wherein bandwidth in the selected node-and-bandwidth pair is a predefined maximum bandwidth.

13. The computer program product of claim 10, wherein the E2E TE LSP crosses two or more TTZs, and wherein each TTZ comprises a summarized TE link state information table.

14. The computer program product of claim 10, wherein bandwidth in the selected node-and-bandwidth pair is the largest among bandwidths of the one or more node-and-bandwidth pairs in the first list.

* * * * *